(12) United States Patent
Hahn et al.

(10) Patent No.: US 12,621,902 B2
(45) Date of Patent: May 5, 2026

(54) SIGNALING METHOD FOR SIDELINK COMMUNICATION DRX OPERATION

(71) Applicants: HYUNDAI MOTOR COMPANY,
Seoul (KR); KIA CORPORATION,
Seoul (KR); Wonkwang University Center For Industry-Academy Cooperation, Iksan-si (KR)

(72) Inventors: Gene Back Hahn, Hwaseong-si (KR);
Ui Hyun Hong, Hwaseong-si (KR);
Hyuk Min Son, Iksan-si (KR)

(73) Assignees: Hyundai Motor Company, Seoul
(KR); Kia Corporation, Seoul (KR);
Wonkwang University Center for Industry-Academy Cooperation,
Iksan-si (KR)

( * ) Notice: Subject to any disclaimer, the term of this
patent is extended or adjusted under 35
U.S.C. 154(b) by 329 days.

(21) Appl. No.: 18/223,742

(22) Filed: Jul. 19, 2023

(65) Prior Publication Data

US 2023/0363045 A1      Nov. 9, 2023

Related U.S. Application Data

(63) Continuation-in-part of application No.
PCT/KR2022/001655, filed on Jan. 28, 2022.

(30) Foreign Application Priority Data

Feb. 3, 2021      (KR) ........................ 10-2021-0015744
Jan. 28, 2022      (KR) ........................ 10-2022-0013400

(51) Int. Cl.
*H04W 76/28*      (2018.01)
*H04W 92/18*      (2009.01)

(52) U.S. Cl.
CPC ............ *H04W 76/28* (2018.02); *H04W 92/18*
(2013.01)

(58) Field of Classification Search
CPC .............................. H04W 76/28; H04W 92/18
See application file for complete search history.

(56)                References Cited

U.S. PATENT DOCUMENTS

2015/0195856 A1      7/2015  Zheng et al.

OTHER PUBLICATIONS

LG Electronics, Inc., "Alignment scheme for Uu DRX and SL
DRX", 3GPP TSG-RAN WG2 Meeting #113-e, R2-2101791, Online,
Jan. 25-Feb. 5, 2021 (uploaded to https://www.3gpp.org//ftp/TSG_
RAN/WG2_RL2/TSGR2_113-e//docs/ on Jan. 15, 2021) (Year:
2021).*

(Continued)

*Primary Examiner* — Brian P Cox
(74) *Attorney, Agent, or Firm* — Morgan Lewis &
Bockius LLP

(57)                ABSTRACT

A method for operation of a reception terminal comprises
the steps of: carrying out, in a first link, SL communication
with a first transmission terminal on the basis of a DRX
operation according to first DRX configuration information;
carrying out, in a second link, communication with a com-
munication node without carrying out the DRX operation;
generating, in the first link and the second link, second DRX
configuration information for the DRX operation; transmit-
ting the second DRX configuration information to the first
transmission terminal and the communication node; and
carrying out, in the first link and the second link, the DRX
operation on the basis of the second DRX configuration
information.

13 Claims, 6 Drawing Sheets

(56)        References Cited

OTHER PUBLICATIONS

MediaTek Inc., "On aligning wake-up time between TX and RX UE", 3GPP TSG-RAN WG2 Meeting #113-e, R2-2101645, Online, Jan. 25-Feb. 5, 2021 (uploaded to https://www.3gpp.org//ftp/TSG_RAN/WG2_RL2/TSGR2_113-e//docs/ on Jan. 15, 2021) (Year: 2021).*

3GPP, "Discussion on configuration and parameter for sidelink DRX", 3GPP TSG-RAN WG2 #113-e, R2-2100273, E-meeting, Jan. 2021, 8 pages.

3GPP, "Discussion on network involvement for SL related DRX", 3GPP TSG-RAN WG2 #113-e, R2-2100275, E-meeting, Jan. 2021, 4 pages.

3GPP, "DRX alignment between Uu and SL", 3GPP TSG-RAN WG2 Meeting #113-e, R2-2100538, e-Meeting, Jan. 25-Feb. 5, 2021, 3 pages.

3GPP, "Alignment of Uu and SL DRX active time", 3GPP TSG RAN WG2 Meeting #113-e, R2-2100623, Electronic meeting, Jan. 25-Feb. 5, 2021, 7 pages.

3GPP, "DRX Alignment between TX and RX UEs", 3GPP TSG-RAN WG2 Meeting #113 electronic, R2-2100796, E-Meeting, Jan. 25-Feb. 5, 2021, 6 pages.

3GPP, "Coordination between Uu DRX and SL DRX", 3GPP TSG-RAN WG2 Meeting #113 electronic, R2-2100931, E-meeting, Jan. 25-Feb. 5, 2021, 5 pages.

3GPP, "DRX coordination between Uu and sidelink", 3GPP TSG-RAN WG2 Meeting #113e, R2-2101599, Electronic Jan. 25-Feb. 5, 2021, 2 pages.

3GPP, "On coordination between Uu DRX and SL DRX", 3GPP TSG-RAN WG2 Meeting #113 electronic, R2-2101646, Online, Jan. 25-Feb. 5, 2021, 6 pages.

3GPP, "Consideration on the sidelink DRX for unicast", 3GPP TSG-RAN WG2 Meeting #113-e, R2-2101762, On-line, Jan. 25-Feb. 5, 2021, 8 pages.

3GPP, "Alignment between Uu DRX and SL DRX", 3GPP TSG-RAN WG2 Meeting #113 electronic, R2-2101764, Jan. 25-Feb. 5, 2020, 6 pages.

3GPP, "Methods for configuring SL DRX relative to Uu DRX", 3GPP TSG-RAN WG2 Meeting #113 electronic, R2-2101855, Online, Jan. 25-Feb. 5, 2021, 4 pages.

International Search dated May 18, 2022 cited in International Patent Application No. PCT/KR2022/001661 (w/English translation).

"Methods for configuring SL DRX relative to Uu DRX," 3GPP TSG-RAN WG2 Meeting #113 electronic Online, Jan. 25 through Feb. 5, 2021 (R2-2101855).

* cited by examiner

PC5-U INTERFACE

PC5-C INTERFACE

PC5 SIGNALING

SIGNALING METHOD FOR SIDELINK COMMUNICATION DRX OPERATION

CROSS-REFERENCE TO RELATED APPLICATION

The present application is a continuation-in-part of currently pending International Patent Application No. PCT/KR2022/001655, filed Jan. 28, 2022, which claims priority to Korean Patent Application No. 10-2021-0015744, filed Feb. 3, 2021, and Korean Patent Application No. 10-2022-0013400, filed Jan. 28, 2022, the entire contents of which is incorporated herein for all purposes by this reference.

BACKGROUND OF THE PRESENT DISCLOSURE

Field of the Present Disclosure

The present disclosure relates to a sidelink communication technique, and more particularly, to a technique for communication based on sidelink discontinuous reception (SL DRX).

Description of Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, resource allocation schemes in sidelink communication may be classified into a mode 1 and a mode 2. When the mode 1 is used, a base station may transmit configuration information (e.g., resource allocation information) for sidelink (SL) communication to a transmitting terminal through a Uu link. The transmitting terminal may receive the configuration information for SL communication from the base station. When the transmitting terminal operates in an idle mode on the Uu link between the base station and the transmitting terminal, this may affect a procedure for transmitting and receiving the configuration information for SL communication. Therefore, methods for efficiently operating a discontinuous reception (DRX) operation on the Uu link and a DRX operation on a sidelink are required. In addition, effective DRX-based communication methods and methods for reducing power consumption are required in a communication environment in which one Uu link and a plurality of sidelinks exist.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

The present disclosure is directed to providing a method and an apparatus for sidelink discontinuous reception (SL DRX) based communication.

An operation method of a receiving terminal, according to various exemplary embodiments of the present disclosure for achieving the above-described objective, may include: performing sidelink (SL) communication with a first transmitting terminal on a first link based on a discontinuous reception (DRX) operation according to first DRX configuration information; performing communication with a communication node on a second link without performing the DRX operation; generating second DRX configuration information for the DRX operation on the first link and the second link; transmitting the second DRX configuration information to the first transmitting terminal and the communication node; and performing the DRX operation based on the second DRX configuration information on the first link and the second link.

The second DRX configuration information may be generated by changing the first DRX configuration information in consideration of the DRX operation on the second link.

The operation method may further include: transmitting, to the first transmitting terminal and the communication node, a DRX trigger indicator indicating that the DRX operation based on the second DRX configuration information is to be performed on the first link and the second link, wherein the DRX operation may be performed on the first link and the second link after the transmitting of the DRX trigger indicator.

The second DRX configuration information may be transmitted when both a first trigger timer configured for the first link and a second trigger timer configured for the second link are expired.

The second DRX configuration information may include information indicating a first DRX cycle for the first link and information indicating a second DRX cycle for the second link.

The second DRX configuration information may include a first time offset applied to a first DRX cycle for the first link and a second time offset applied to a second DRX cycle for the second link.

The second DRX configuration information may be configured based on a resource pool (RP)-specific scheme, a cell-specific scheme, or a user equipment (UE)-specific scheme.

When the first link is a first SL and the second link is a second SL, the communication node may be a second transmitting terminal, and when the first link is the first SL and the second link is a Uu link, the communication node may be a base station.

An operation method of a transmitting terminal, according to various exemplary embodiments of the present disclosure for achieving the above-described objective, may include: performing sidelink (SL) communication with a first receiving terminal on a first link based on a discontinuous reception (DRX) operation according to first DRX configuration information; performing SL communication with a second receiving terminal on a second link without performing the DRX operation; generating second DRX configuration information for the DRX operation on the first link and the second link; transmitting the second DRX configuration information to the first receiving terminal and the second receiving terminal; and performing the DRX operation based on the second DRX configuration information on the first link and the second link.

The second DRX configuration information may be generated by changing the first DRX configuration information in consideration of the DRX operation on the second link, and the second DRX configuration information may be commonly applied to the first link and the second link.

The operation method may further include: transmitting, to the first receiving terminal and the second receiving terminal, a DRX trigger indicator indicating that the DRX operation based on the second DRX configuration information is to be performed on the first link and the second link, wherein the DRX operation may be performed on the first link and the second link after the transmitting of the DRX trigger indicator.

The second DRX configuration information may be transmitted when both a first trigger timer configured for the first link and a second trigger timer configured for the second link are expired.

The second DRX configuration information may include information indicating a first DRX cycle for the first link and information indicating a second DRX cycle for the second link.

The second DRX configuration information may include a first time offset applied to a first DRX cycle for the first link and a second time offset applied to a second DRX cycle for the second link.

An operation method of a first terminal, according to various exemplary embodiments of the present disclosure for achieving the above-described objective, may include: transmitting sidelink (SL) data to a receiving terminal on a first link in consideration of a discontinuous reception (DRX) operation according to first DRX configuration information; receiving data from a transmitting node on a second link without performing the DRX operation; generating second DRX configuration information for the DRX operation on the first link and the second link; transmitting the second DRX configuration information to the receiving terminal and the transmitting node; and performing the DRX operation based on the second DRX configuration information on the first link and the second link.

The second DRX configuration information may be generated by changing the first DRX configuration information in consideration of the DRX operation on the second link.

The operation method may further include: transmitting, to the receiving terminal and the transmitting node, a DRX trigger indicator indicating that the DRX operation based on the second DRX configuration information is to be performed on the first link and the second link, wherein the DRX operation may be performed on the first link and the second link after the transmitting of the DRX trigger indicator.

The second DRX configuration information may be transmitted when both a first trigger timer configured for the first link and a second trigger timer configured for the second link are expired.

The second DRX configuration information may include at least one of information indicating a first DRX cycle for the first link, a first time offset applied to the first DRX cycle, information indicating a second DRX cycle for the second link, or a second time offset applied to the second DRX cycle.

When the first link is a first SL and the second link is a second SL, the transmitting node may be a transmitting terminal, and when the first link is the first SL and the second link is a Uu link, the transmitting node may be a base station.

According to an exemplary embodiment of the present disclosure, when DRX operations are required in a plurality of links, a terminal may generate DRX configuration information applied to the plurality of links and transmit the DRX configuration information on each of the plurality of links. The terminal may perform DRX operations on the plurality of links based on the DRX configuration information. Therefore, the DRX operations can be efficiently performed on the plurality of links, and the efficiency of the communication system can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
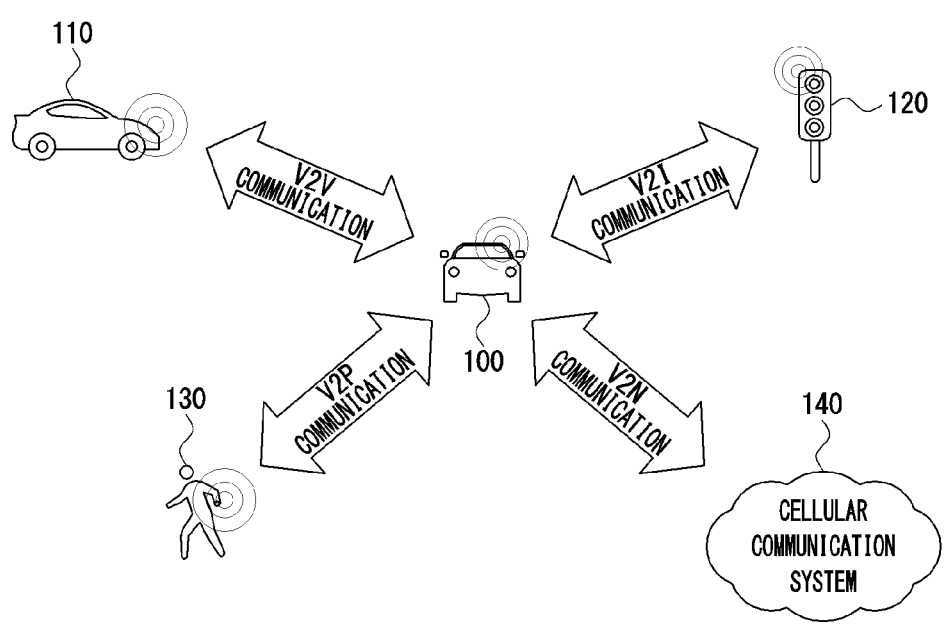
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
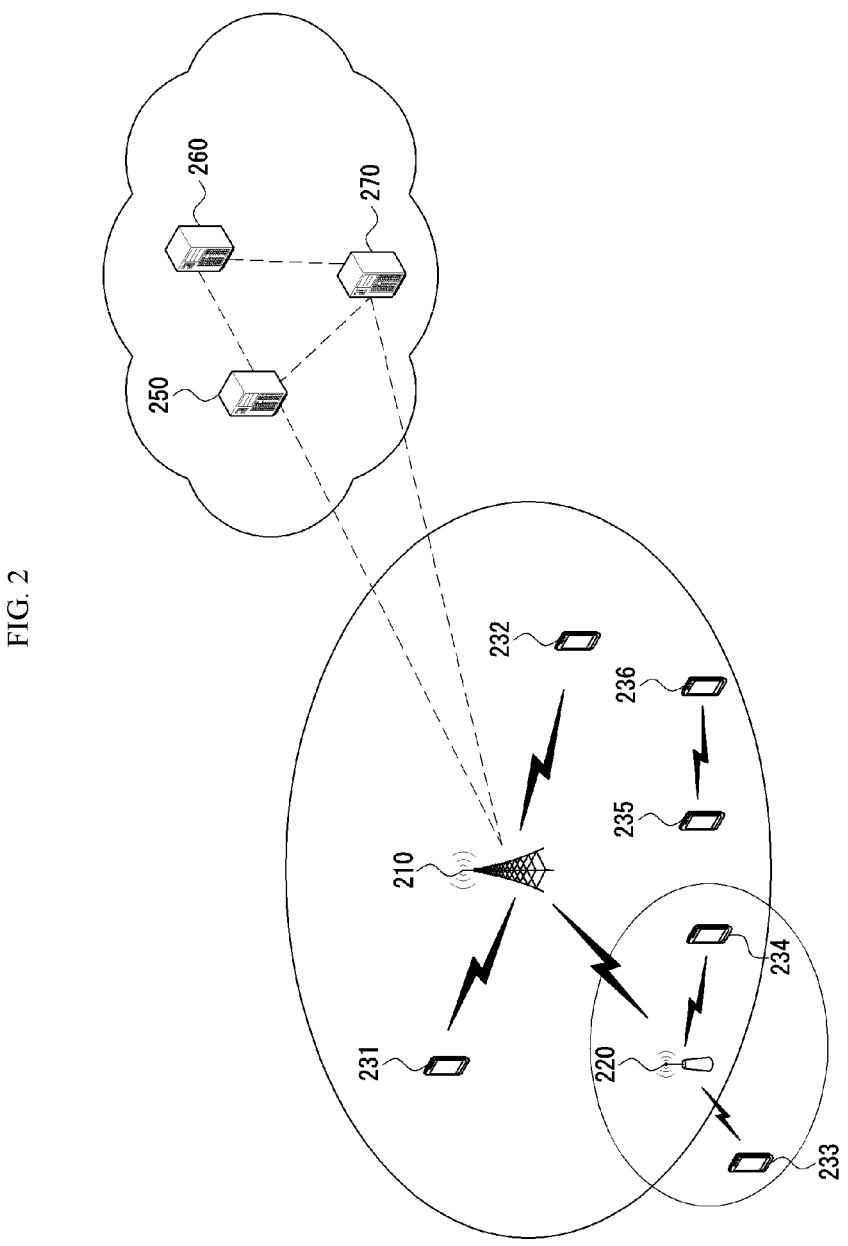
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
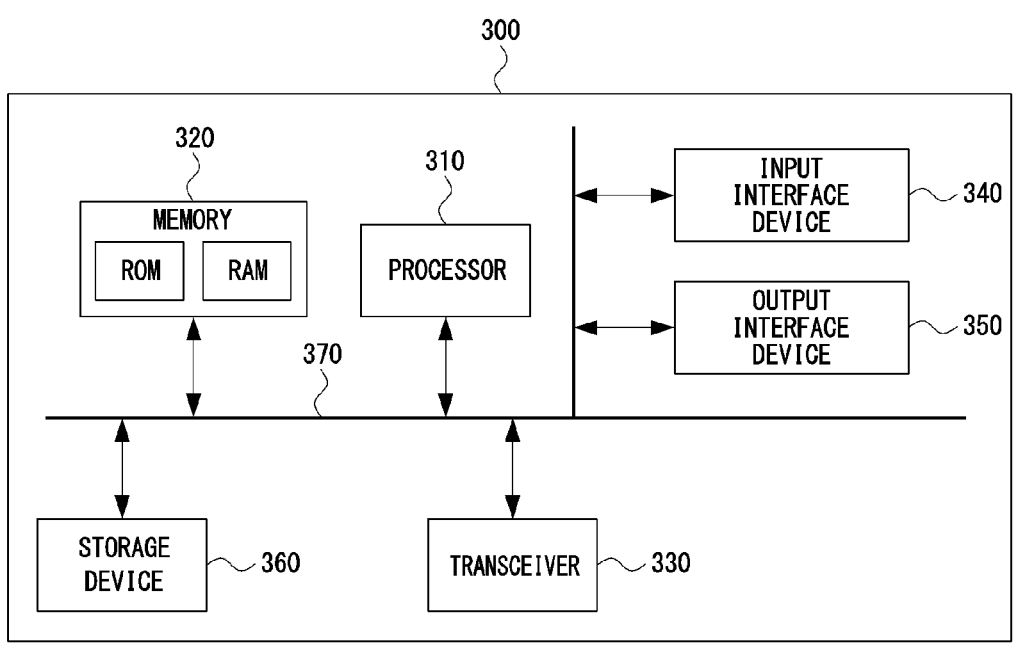
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Herein, the processor 310 and the memory 320 may be implemented as separate semiconductor circuits. Alternatively, the processor 310 and the memory 320 may be implemented as a single integrated semiconductor circuit. The processor 310 may embody one or more processor(s).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
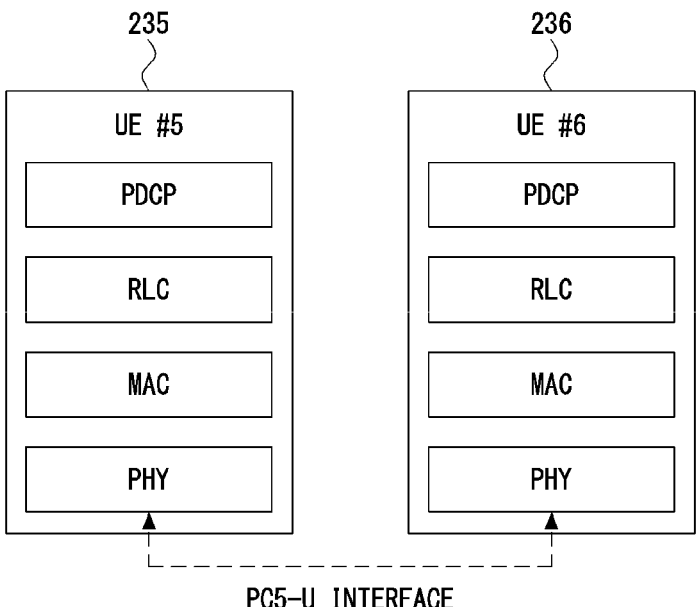
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
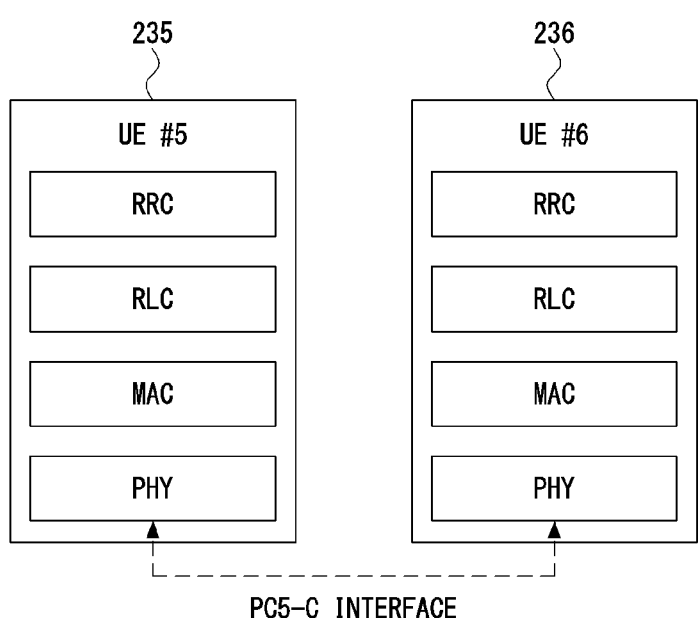
FIG. 5 is a block diagram illustrating a first exemplary embodiment of a control plane protocol stack of a UE performing sidelink communication.
Figure 6:
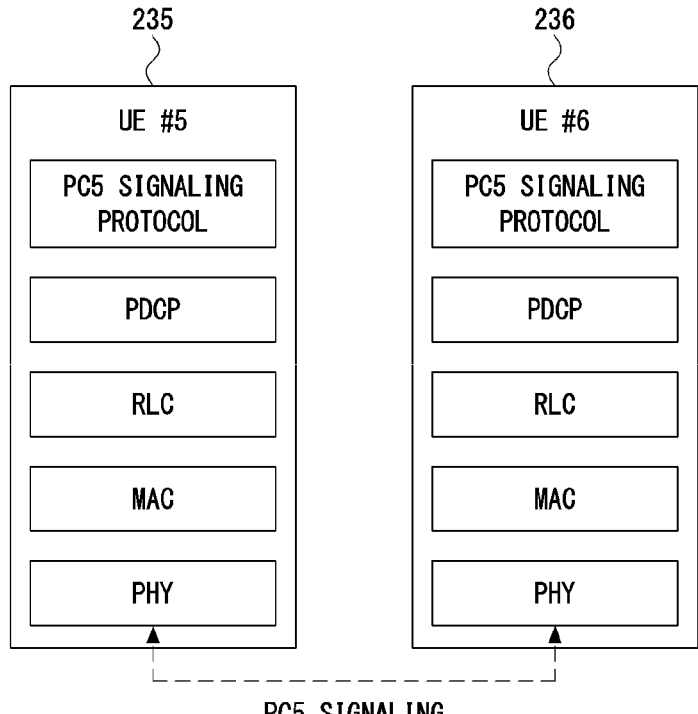
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

In exemplary embodiments, 'configuring an operation (e.g., DRX operation)' may refer to signaling of 'configuration information (e.g., information elements, parameters) for the operation' and/or 'information instructing to perform the operation'. 'Configuring an information element (e.g., parameter)' may mean that the information element is signaled. The signaling may be at least one of system information (SI) signaling (e.g., transmission of a system information block (SIB) and/or master information block (MIB)), RRC signaling (e.g., transmission of an RRC parameter and/or higher layer parameter), MAC control element (CE) signaling, or PHY signaling (e.g., transmission of downlink control information (DCI), uplink control information (UCI), and/or sidelink control information (SCI)). Here, transmission of SCI may refer to transmission of 1st-stage SCI and/or 2nd-stage SCI.

In exemplary embodiments, a transmitting terminal may refer to a terminal transmitting SL data, and a receiving terminal may refer to a terminal receiving the SL data. The receiving terminal may support SL discontinuous reception (DRX). An operation mode of the receiving terminal supporting SL DRX may transition from a non-communication mode to a communication mode at a specific time, and the receiving terminal operating in the communication mode may perform a channel and/or signal reception operation. The non-communication mode may refer to a mode in which the receiving terminal does not perform communication (e.g., reception operation). For example, the non-communication mode may be an inactive mode, idle mode, or sleep mode. The communication mode may refer to a mode in which the receiving terminal performs communication (e.g., reception operation). For example, the communication mode may be a wake-up mode, connected mode, or active mode.

The receiving terminal may operate according to a DRX cycle. For example, the operation mode of the receiving terminal may be transitioned according to the DRX cycle. The DRX cycle may refer to an interval between times at which the operation mode of the receiving terminal transitions to the wake-up mode. A 'longer DRX cycle' may mean a 'longer time interval' at which the receiving terminal wakes up. When SL DRX is applied from the perspective of the transmitting terminal, the transmitting terminal may wake up for transmission according to the DRX cycle. For example, when there is SL data to be transmitted to the receiving terminal, the transmitting terminal may attempt to transmit the SL data in consideration of the DRX cycle. The receiving terminal may attempt to receive the SL data according to the DRX cycle.

In sidelink communication, one or more DRX operations may be performed concurrently. In this case, change, reconfiguration, or indication for DRX configuration information may be required. By the above operation, one or more DRX operations can be efficiently performed. In exemplary embodiments, methods for performing one or more DRX operations using initial DRX configuration information as it is, and methods of modifying (e.g., changing) the initial DRX configuration information to perform one or more DRX operations will be described. Extensions, variations, and/or combinations of exemplary embodiments may be possible.

[Method for a Receiving Terminal to Negotiate (or Coordinate) DRX Operations with a Plurality of Transmitting Nodes]

Figure 7:
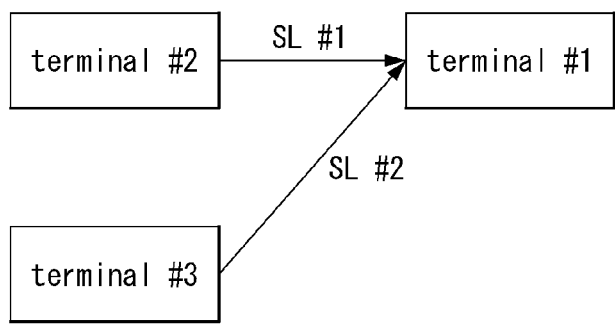
FIG. 7 is a conceptual diagram illustrating a first exemplary embodiment of a communication system supporting sidelink communication.

FIG. 7 is a conceptual diagram illustrating a first exemplary embodiment of a communication system supporting sidelink communication.

As shown in FIG. 7, a communication system may include a plurality of transmitting terminals (e.g., terminal #2 and terminal #3) and a receiving terminal (e.g., terminal #1). Each of the terminals #1, #2, and #3 may be a vehicle (V)-UE located in a vehicle. A SL #1 may be established between the terminal #1 and terminal #2, and sidelink communication between the terminal #1 and terminal #2 may be performed on the SL #1. A SL #2 may be established between the terminal #1 and terminal #3, and sidelink communication between the terminal #1 and terminal #3 may be performed on the SL #2. The receiving terminal may perform a negotiation procedure (e.g., coordination procedure) for DRX operations with a plurality of transmitting terminals (e.g., terminal #2 and terminal #3).

A DRX operation may be performed on the SL #1 among the SLs #1 and #2. A base station and/or the terminal #2 may configure (e.g., signal) configuration information for the DRX operation on the SL #1 (hereinafter referred to as 'DRX configuration information') to the terminal #1. The initially-configured DRX configuration information may be referred to as initial DRX configuration information. In exemplary embodiments, the DRX configuration information may include at least one of a DRX cycle, on-duration information, or off-duration information. In addition, the DRX configuration information may further include at least one of a time offset, trigger timer, or DRX trigger indicator described later. The DRX configuration information may be applied to one or more links. When the DRX configuration information is applied to a plurality of links, the DRX configuration information may be common DRX configuration information commonly applied to the plurality of links. Alternatively, the DRX configuration information may be interpreted as including first DRX configuration information applied to a first link among the plurality of links and second DRX configuration information applied to a second link among the plurality of links. The first DRX configuration information may be configured independently of the second DRX configuration information. Alternatively, the first DRX configuration information may be configured to be associated with (e.g., mapped to) the second DRX configuration information.

In an on-duration within a DRX cycle, the terminal(s) may operate in the communication mode, and in an off-duration within the DRX cycle, the terminal(s) may operate in the non-communication mode. The terminal #1 may perform a DRX operation on the SL #1 based on the DRX configuration information (e.g., initial DRX configuration information). The terminal #1 may operate in the communication mode without performing a DRX operation on the SL #2. That is, the terminal #1 may perform sidelink communication with the terminal #3 on the SL #2.

Thereafter, a DRX operation may be required on the SL #2. That is, the DRX operations may be required on both the SLs #1 and #2. In this case, the terminal #1 may generate DRX configuration information applied to a plurality of sidelinks (e.g., SLs #1 and #2) by considering the DRX configuration information (e.g., initial DRX configuration information) configured for the SL #1. In this case, the terminal #1 may determine DRX cycles (e.g., SL DRX cycles) for minimization of power consumptions and/or for efficient DRX operations. The DRX configuration information may be commonly applied to the plurality of sidelinks. Alternatively, the DRX configuration information may include first DRX configuration information applied to the SL #1 and second DRX configuration information applied to the SL #2.

The terminal #1 may signal (e.g., configure) DRX configuration information (e.g., DRX cycles) for the SLs #1 and #2 to the terminal #2 and/or terminal #3. The DRX configuration information changed, modified, or reconfigured based on the initial DRX configuration information may be referred to as 'modified (M)-DRX configuration information'. The terminal #2 and/or terminal #3 may receive the M-DRX configuration information from the terminal #1, and support (e.g., perform) DRX operations based on information element(s) included in the M-DRX configuration information. After transmitting the M-DRX configuration information, the terminal #1 may perform a DRX operation based on the M-DRX configuration information on each of the SL #1 and the SL #2.

The DRX configuration information (e.g., initial DRX configuration information, M-DRX configuration information) may be configured according to a resource pool (RP)-specific scheme, a cell-specific scheme, or a UE-specific scheme. When the RP-specific scheme is used, the same DRX configuration information may be applied within the same RP.

According to the aforementioned M-DRX configuration information, a DRX cycle for the SL #1 and a DRX cycle for the SL #2 may be set identically. Alternatively, the DRX cycle for the SL #1 and the DRX cycle for the SL #2 may be set differently. Alternatively, the same DRX cycle and different time offsets may be set to the terminal #2 and terminal #3. For example, a time offset #1 may be set to the terminal #2, and a time offset #2 may be set to the terminal #3. In this case, a DRX operation between the terminal #2 and the terminal #1 may be performed considering the DRX cycle and the time offset #1, and a DRX operation between the terminal #3 and the terminal #1 may be performed considering the DRX cycle and time offset #2. When the time offset is set, the transmitting terminal may perform a transmission operation after the time offset from a start time of the DRX cycle, and the receiving terminal may perform a reception operation after the time offset from the start time of the DRX cycle. That is, the transmission operation of the transmitting terminal may be delayed by the time offset, and the reception operation of the receiving terminal may be delayed by the time offset. Alternatively, the time offset may be set only to one terminal. For example, when the time offset #1 set to the terminal #2 is 0 and the time offset #2 set to the terminal #3 is not 0, the time offset may be interpreted as being set to only one terminal (e.g., terminal #3). Information on the time offset may be included in the DRX configuration information (e.g., M-DRX configuration information). The time offset may be set in units of symbols, mini-slots, slots, or subframes.

A timing of transmitting the DRX configuration information (e.g., M-DRX configuration information) to the transmitting terminals (e.g., terminals #2 and #3) may be configured based on a triggering condition for the receiving terminal (e.g., terminal #1) to transition to the non-communication mode. The receiving terminal may perform a DRX operation after transitioning from the communication mode to the non-communication mode. The triggering condition for starting a DRX operation may be a case when a preset timer expires. In exemplary embodiments, the preset timer may be referred to as a 'trigger timer'. The trigger timer may be configured for each of the SL #1 and SL #2. The same trigger timer or different trigger timers may be configured for the SL #1 and SL #2. When all trigger timers configured in the SL #1 and SL #2 are expired, the terminal #1 may transmit DRX configuration information (e.g., M-DRX configuration information) to the terminal #2 and/or terminal #3. Thereafter, the terminal #1 may enter the non-communication mode, and the terminals may efficiently perform DRX operations. Information on the trigger timer(s) may be included in the DRX configuration information.

Meanwhile, in the exemplary embodiment shown in FIG. 7, when the DRX operations are performed on all SLs supported by the terminal #1, common DRX configuration information may be shared by the terminal #1, terminal #2, and terminal #3. The common DRX configuration information may be equally applied to all SLs supported by the terminal #1. The common DRX configuration information may refer to initial DRX configuration information or M-DRX configuration information. The base station and/or transmitting terminal (e.g., terminal #2 and/or terminal #3) may configure (e.g., signal) the common DRX configuration information to the receiving terminal (e.g., terminal #1). Together with or independently of the above-described operation, the base station and/or another terminal may configure (e.g., signal) the common DRX configuration information to the transmitting terminals (e.g., terminal #2 and terminal #3). The another terminal may be a terminal that transmit SL data to the terminals #2 and #3. From the perspective of the terminals #2 and #3, the another terminal may be a transmitting terminal. In the communication environment described above, the terminal #1 may transmit to the terminal #2 and the terminal #3 an indicator indicating that DRX operations are to be performed on all SLs supported by the terminal #1 based on the common DRX configuration information. The above-mentioned indicator may be referred to as 'DRX trigger indicator'. When the DRX trigger indicator is received from the terminal #1, the terminals #2 and #3 may determine that DRX operations are to be performed based on the common DRX configuration information. After transmitting the DRX trigger indicator, the terminal #1 may perform a DRX operation based on the common DRX configuration information in each of the SL #1 and the SL #2.

The condition for changing the DRX configuration information may be a case when DRX operations are to be performed on all SLs supported by the terminal #1 or when DRX operations are to be performed on some SLs among all SLs supported by the terminal #1. The above-described exemplary embodiments may be applied to a communication environment in which one receiving terminal performs SL communication with two or more transmitting terminals. In this case, the receiving terminal may transmit DRX configuration information (e.g., M-DRX configuration information) to a plurality of transmitting terminals. In addition, the receiving terminal may transmit a DRX trigger indicator to the plurality of transmitting terminals. The terminals may perform DRX operations based on the DRX configuration information (e.g., M-DRX configuration information) and/ or the DRX trigger indicator.

Figure 8:
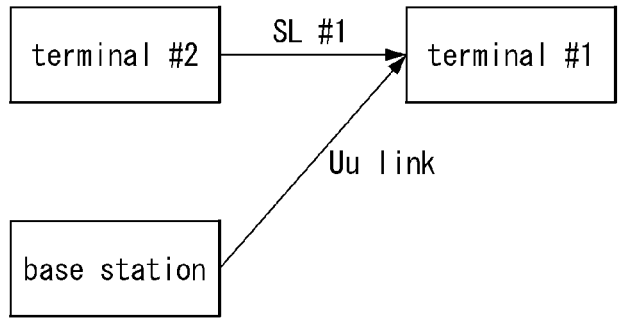
FIG. 8 is a conceptual diagram illustrating a second exemplary embodiment of a communication system supporting sidelink communication.

FIG. 8 is a conceptual diagram illustrating a second exemplary embodiment of a communication system supporting sidelink communication.

As shown in FIG. 8, a communication system may include a plurality of transmitting nodes (e.g., terminal #2 and base station) and a receiving terminal (e.g., terminal #1). Each of the terminals #1 and #2 may be a V-UE located in a vehicle. A SL #1 may be established between the terminal #1 and the terminal #2, and sidelink communication between the terminal #1 and the terminal #2 may be performed on the SL #1. A Uu link may be established between the terminal #1 and the base station, and communication between the terminal #1 and the base station may be performed on the Uu link. The receiving terminal may perform a negotiation procedure (e.g., coordination procedure) for DRX operations with a plurality of transmitting nodes (e.g., terminal #2 and base station).

The exemplary embodiments described with reference to FIG. 7 may be applied to the communication environment (e.g., communication system) shown in FIG. 8. The terminal #1 may transmit DRX configuration information to the terminal #2 through the SL #1, and transmit DRX configuration information to the base station through the Uu link. In this case, the DRX configuration information may be transmitted through a physical uplink control channel (PUCCH) or a physical uplink shared channel (PUSCH). The DRX configuration information may be initial DRX configuration information or M-DRX configuration information.

DRX configuration of the Uu link may take precedence over DRX configuration of the SL #1. For example, when DRX operations are to be supported on both the Uu link and the SL #1, the DRX configuration of the Uu link may not be changed and the DRX configuration of the SL #1 may be changed. When the terminal #1 performs DRX operations on the Uu link and the SL #1, the DRX configuration information for the Uu link may be maintained, and the DRX configuration information for the SL #1 may be changed in consideration of the DRX operation on the Uu link. The terminal #1 may change the DRX configuration information (e.g., DRX cycle, on-duration, off-duration, trigger timer, and/or time offset) of the SL #1 in consideration of the DRX operation on the Uu link. The terminal #1 may configure (e.g., signal) the changed DRX configuration information (e.g., M-DRX configuration information) to the terminal #2. Therefore, the DRX operations can be efficiently performed in the link Uu and the SL #1.

[Methods for a Transmitting Terminal to Negotiate (or Coordinate) DRX Operations with a Plurality of Receiving Nodes]

Figure 9:
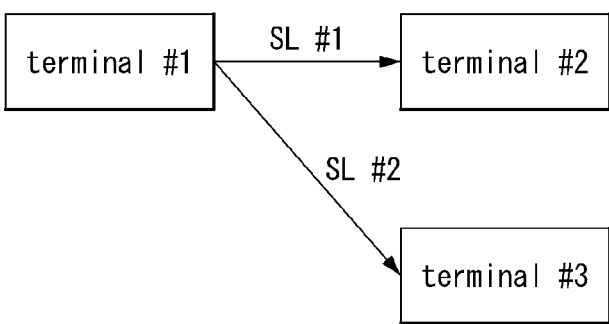
FIG. 9 is a conceptual diagram illustrating a third exemplary embodiment of a communication system supporting sidelink communication.

FIG. 9 is a conceptual diagram illustrating a third exemplary embodiment of a communication system supporting sidelink communication.

As shown in FIG. 9, a communication system may include a transmitting terminal (e.g., terminal #1) and a plurality of receiving terminals (e.g., terminals #2 and #3). Each of the terminals #1, #2, and #3 may be a V-UE located in a vehicle. A SL #1 may be established between the terminal #1 and the terminal #2, and sidelink communication between the terminal #1 and the terminal #2 may be performed on the SL #1. A SL #2 may be established between the terminal #1 and the terminal #3, and sidelink communication between the terminal #1 and the terminal #3 may be performed on the SL #2. The transmitting terminal may perform a negotiation procedure (e.g., coordination procedure) for DRX operations with a plurality of receiving terminals (e.g., terminal #2 and terminal #3).

A DRX operation may be performed only on the SL #1 among the SLs #1 and #2. For example, a base station and/or another terminal (e.g., terminal transmitting SL data to the terminal #1) may configure (e.g., signal) initial DRX configuration information to the terminal #1. Together with or independently of the above-described operation, the terminal #1 and/or base station may configure (e.g., signal) initial DRX configuration information to the terminal #2. The terminal #2 may perform a DRX operation on the SL #1 based on the initial DRX configuration information. Since the initial DRX configuration information is not configured to the terminal #3, the terminal #3 may operate in the communication mode on the SL #2 without performing a DRX operation.

Thereafter, when a DRX operation is required not only on the SL #1 but also on the SL #2, the terminal #1 (e.g., transmitting terminal) may generate DRX configuration information (e.g., M-DRX configuration information) applied to both the SLs #1 and #2 by considering the initial DRX configuration information (e.g., DRX configuration information for the SL #1). The M-DRX configuration information may be DRX configuration information changed based on the initial DRX configuration information. The terminal #1 may generate the DRX configuration information for minimizing power consumption and/or performing efficient DRX operations. The terminal #1 may configure (e.g., signal) the M-DRX configuration information to the receiving terminals (e.g., terminals #2 and #3). The M-DRX configuration information may be commonly applied to the SLs #1 and #2. Alternatively, the M-DRX configuration information may include first M-DRX configuration information applied to the SL #1 and second M-DRX configuration information applied to the SL #2. The terminal #2 may receive the M-DRX configuration information from the terminal #1, and may perform the DRX operation on the SL #1 based on the M-DRX configuration information. The terminal #3 may receive the M-DRX configuration information from the terminal #1, and may perform the DRX operation on the SL #2 based on the M-DRX configuration information.

The DRX configuration information (e.g., initial DRX configuration information, M-DRX configuration information) may be configured according to an RP-specific scheme, a cell-specific scheme, or a UE-specific scheme. When the RP-specific scheme is used, the same DRX configuration information may be applied within the same RP.

According to the aforementioned M-DRX configuration information, a DRX cycle for the SL #1 and a DRX cycle for the SL #2 may be set identically. Alternatively, the DRX cycle for the SL #1 and the DRX cycle for the SL #2 may be set differently. Alternatively, the same DRX cycle and different time offsets may be set to the terminal #2 and terminal #3. For example, a time offset #1 may be set to the terminal #2, and a time offset #2 may be set to the terminal #3. In this case, a DRX operation between the terminal #2 and the terminal #1 may be performed considering the DRX cycle and the time offset #1, and a DRX operation between the terminal #3 and the terminal #1 may be performed considering the DRX cycle and time offset #2. When the time offset is set, the transmitting terminal may perform a transmission operation after the time offset from a start time of the DRX cycle, and the receiving terminal may perform a reception operation after the time offset from the start time of the DRX cycle. That is, the transmission operation of the transmitting terminal may be delayed by the time offset, and the reception operation of the receiving terminal may be delayed by the time offset. Alternatively, the time offset may be set only to one terminal. For example, when the time offset #1 set to the terminal #2 is 0 and the time offset #2 set to the terminal #3 is not 0, the time offset may be interpreted as being set to only one terminal (e.g., terminal #3). Information on the time offset may be included in the DRX configuration information (e.g., M-DRX configuration information). The time offset may be set in units of symbols, mini-slots, slots, or subframes.

A timing of transmitting the DRX configuration information (e.g., M-DRX configuration information) to the receiving terminals (e.g., terminals #2 and #3) may be configured based on a triggering condition for the transmitting terminal (e.g., terminal #1) to transition to the non-communication mode. The transmitting terminal may perform a DRX operation after transitioning from the communication mode to the non-communication mode. The triggering condition for starting a DRX operation may be a case when a preset timer expires. The trigger timer may be configured for each of the SL #1 and the SL #2. The same trigger timer or different trigger timers may be configured for the SL #1 and the SL #2. When all trigger timers configured in the SL #1 and the SL #2 are expired, the terminal #1 may transmit DRX configuration information (e.g., M-DRX configuration information) to the terminal #2 and/or terminal #3. Thereafter, the terminal #1 may enter the non-communication mode, and the terminals may efficiently perform DRX operations. Information on the trigger timer(s) may be included in the DRX configuration information.

Meanwhile, in the exemplary embodiment shown in FIG. 9, when the DRX operations are performed on all SLs supported by the terminal #1, common DRX configuration information may be shared by the terminal #1, terminal #2, and terminal #3. The common DRX configuration information may be equally applied to all SLs supported by the terminal #1. The common DRX configuration information may refer to initial DRX configuration information or M-DRX configuration information. The base station and/or another terminal (e.g., terminal transmitting SL data to the terminal #1) may configure (e.g., signal) the common DRX configuration information to the terminal #1. Together with or independently of the above-described operation, the base station and/or the terminal #1 may configure (e.g., signal) the common DRX configuration information to the receiving terminals (e.g., terminal #2 and terminal #3).

In the communication environment described above, the terminal #1 may transmit to the terminal #2 and terminal #3 an indicator (i.e., DRX trigger indicator) indicating that DRX operations are to be performed on all SLs supported by the terminal #1 based on the common DRX configuration information. When the DRX trigger indicator is received from the terminal #1, the terminals #2 and #3 may determine that DRX operations are to be performed based on the common DRX configuration information. After transmitting the DRX trigger indicator, the terminal #1 may perform a DRX operation based on the common DRX configuration information on each of the SL #1 and the SL #2.

The condition for changing the DRX configuration information may be a case when DRX operations are to be performed on all SLs supported by the terminal #1 or when DRX operations are to be performed on some SLs among all SLs supported by the terminal #1. The above-described exemplary embodiments may be applied to a communication environment in which one transmitting terminal performs SL communication with two or more receiving terminals. In this case, the transmitting terminal may transmit DRX configuration information (e.g., M-DRX configuration information) to a plurality of receiving terminals. In addition, the transmitting terminal may transmit a DRX trigger indicator to the plurality of receiving terminals. The terminals may perform DRX operations based on the DRX configuration information (e.g., M-DRX configuration information) and/or the DRX trigger indicator.

Figure 10:
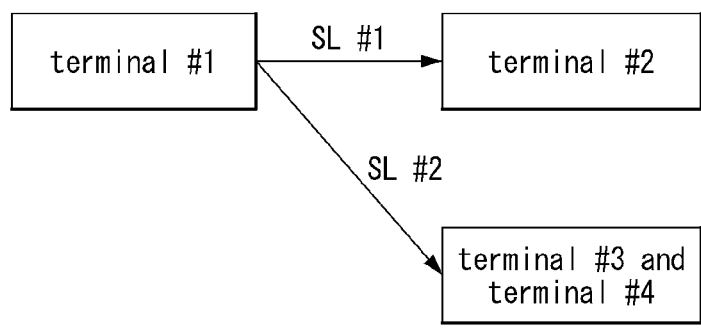
FIG. 10 is a conceptual diagram illustrating a fourth exemplary embodiment of a communication system supporting sidelink communication.

FIG. 10 is a conceptual diagram illustrating a fourth exemplary embodiment of a communication system supporting sidelink communication.

As shown in FIG. 10, a communication system may include a transmitting terminal (e.g., terminal #1) and a plurality of receiving terminals (e.g., terminals #2, #3, and #4). Each of the terminals #1, #2, #3, and #4 may be a V-UE located in a vehicle. A SL #1 may be established between the terminal #1 and the terminal #2, and sidelink communication (e.g., unicast communication) between the terminal #1 and the terminal #2 may be performed on the SL #1. A SL #2 may be established between the terminal #1 and a plurality of terminals (e.g., terminals #3 and #4), and sidelink communication (e.g., groupcast communication or broadcast communication) between the terminal #1 and the plurality of terminals (e.g., terminals #3 and #4) may be performed on the SL #2. The transmitting terminal may perform a negotiation procedure (e.g., coordination procedure) for DRX operations with a plurality of receiving terminals (e.g., terminals #2, #3, and #4).

The terminal #1 may perform sidelink communication using at least two of unicast, groupcast, and broadcast scheme. In this case, a specific cast type may take precedence over another cast type. For example, DRX configuration information applied to a second cast type or DRX configuration information applied to both a first cast type and the second cast type may be configured or changed based on DRX configuration information of the first cast type. For example, when the groupcast scheme has the highest priority, DRX configuration information configured for the groupcast scheme may be maintained, and DRX configuration information for other cast types (e.g., unicast and/or broadcast) may be changed in consideration of the DRX configuration information configured for the group cast scheme. Alternatively, when the unicast scheme has the highest priority, DRX configuration information configured for the unicast scheme may be maintained, and DRX configuration information for other cast types (e.g., groupcast and/or broadcast) may be changed in consideration of the DRX configuration information configured for the unicast scheme.

The terminal #1 (e.g., transmitting terminal) may configure (e.g., signal) the changed DRX configuration information (e.g., M-DRX configuration information) to the receiving terminal(s). The receiving terminal(s) may receive the M-DRX configuration information from the terminal #1. The receiving terminal(s) may perform DRX operations based on the M-DRX configuration information. The M-DRX configuration information may be DRX configuration information commonly applied for a plurality of cast types. Alternatively, the M-DRX configuration information may include first DRX configuration information applied to a first cast type (e.g., a cast type of the SL #1) and second DRX configuration information applied to a second cast type (e.g., cast type of the SL #2). In communication according to the first cast type (e.g., the cast type having the highest priority), the terminals may perform DRX operations based on the existing DRX configuration information. In communication according to the second cast type (e.g., the cast type having a lower priority than the first cast type), the terminals may perform DRX operations based on the M-DRX configuration information.

[Method for a Transmitting Terminal and a Terminal Acting as a Receiving Terminal to Negotiate (or Coordinate) a DRX Operation]

Figure 11:
FIG. 11 is a conceptual diagram illustrating a fifth exemplary embodiment of a communication system supporting sidelink communication.

FIG. 11 is a conceptual diagram illustrating a fifth exemplary embodiment of a communication system supporting sidelink communication.

As shown in FIG. 11, a communication system may include terminals #0, #1, and #2. Each of the terminals #0, #1, and #2 may be a V-UE located in a vehicle. A SL #1 may be established between the terminal #0 and the terminal #1, and sidelink communication between the terminal #0 and the terminal #1 may be performed on the SL #1. A SL #2 may be established between the terminal #1 and the terminal #2, and sidelink communication between the terminal #1 and the terminal #2 may be performed on the SL #2. The terminal #1 may operate as a receiving terminal in sidelink communication between the terminal #1 and the terminal #0. The terminal #1 may operate as a transmitting terminal in sidelink communication between the terminal #1 and the terminal #2. The terminal #1 may perform a negotiation (or coordination) operation for a DRX operation with the terminal #0, and may perform a negotiation (or coordination) operation for a DRX operation with the terminal #2.

A DRX operation may be performed only on the SL #2 among the SLs #1 and #2. For example, the terminal #1 and/or a base station may configure (e.g., signal) initial DRX configuration information to the terminal #2. The terminal #2 may perform a DRX operation on the SL #2 based on the initial DRX configuration information. The terminal #1 may operate in the communication mode on the SL #1 without performing a DRX operation.

Thereafter, a DRX operation may be required on the SL #1. That is, the DRX operations may be required on both the SLs #1 and #2. In this case, the terminal #1 may generate DRX configuration information applied to a plurality of sidelinks (e.g., SLs #1 and #2) by considering the DRX configuration information (e.g., initial DRX configuration information) configured for the SL #2. In this case, the terminal #1 may determine a DRX cycle (e.g., SL DRX cycle) for minimization of power consumptions and/or for efficient DRX operations. The terminal #1 may signal (e.g., configure) DRX configuration information (e.g., DRX cycle) for the SLs #1 and #2 to the terminal #0 and the terminal #2, respectively. The DRX configuration information for the SLs #1 and #2 may be M-DRX configuration information. The terminals may perform DRX operations based on the M-DRX configuration information. The M-DRX configuration information may be DRX configuration information commonly applied to the SLs #1 and #2. Alternatively, the M-DRX configuration information may include first DRX configuration information applied to the SL #1 and second DRX configuration information applied to the SL #2.

The above-described DRX configuration information (e.g., initial DRX configuration information, M-DRX configuration information) may be configured to the terminal(s). The base station and/or another terminal (e.g., terminal transmitting SL data to the terminal #0) may configure (e.g., signal) DRX configuration information to the terminal #0. Together with or independently of the above-described operation, the base station and/or terminal #0 may configure (e.g., signal) DRX configuration information to the terminal #1. Together with or independently of the above-described operation, the base station and/or the terminal #1 may configure (e.g., signal) DRX configuration information to the terminal #2.

The DRX configuration information (e.g., initial DRX configuration information, M-DRX configuration information) may be configured according to a resource pool (RP)-specific scheme, a cell-specific scheme, or a UE-specific scheme. When the RP-specific scheme is used, the same DRX configuration information may be applied within the same RP.

According to the aforementioned M-DRX configuration information, a DRX cycle for the SL #1 and a DRX cycle for the SL #2 may be set identically. Alternatively, the DRX cycle for the SL #1 and the DRX cycle for the SL #2 may be set differently. Alternatively, the same DRX cycle and different time offsets may be set to the terminal #0 and terminal #2. For example, a time offset #1 may be set to the terminal #0, and a time offset #2 may be set to the terminal #2. In this case, a DRX operation between the terminal #0 and the terminal #1 may be performed considering the DRX cycle and the time offset #1, and a DRX operation between the terminal #2 and the terminal #1 may be performed considering the DRX cycle and time offset #2.

When the time offset is set, the transmitting terminal may perform a transmission operation after the time offset from a start time of the DRX cycle, and the receiving terminal may perform a reception operation after the time offset from the start time of the DRX cycle. That is, the transmission operation of the transmitting terminal may be delayed by the time offset, and the reception operation of the receiving terminal may be delayed by the time offset. Alternatively, the time offset may be set only to one terminal. For example, when the time offset #1 set to the terminal #0 is 0 and the time offset #2 set to the terminal #2 is not 0, the time offset may be interpreted as being set to only one terminal (e.g., terminal #2). Information on the time offset may be included in the DRX configuration information (e.g., M-DRX configuration information). The time offset may be set in units of symbols, mini-slots, slots, or subframes.

A timing of transmitting the DRX configuration information (e.g., M-DRX configuration information) to the terminals #0 and/or #2 may be configured based on a triggering condition for the terminal #1 to transition to the non-communication mode. The terminal #1 may perform a DRX operation after transitioning from the communication mode to the non-communication mode. The triggering condition for starting a DRX operation may be a case when a preset timer expires. The same trigger timer or different trigger timers may be configured for the SL #1 and the SL #2. When all trigger timers configured in the SL #1 and the SL #2 are expired, the terminal #1 may transmit DRX configuration information (e.g., M-DRX configuration information) to the terminal #0 and/or terminal #2. Thereafter, the terminal #1 may enter the non-communication mode, and the terminals may efficiently perform DRX operations. Information on the trigger timer(s) may be included in the DRX configuration information.

Meanwhile, in the exemplary embodiment shown in FIG. 11, when the DRX operations are performed on all SLs supported by the terminal #1, common DRX configuration information may be shared by the terminal #0, terminal #1, and terminal #2. The common DRX configuration information may be equally applied to all SLs supported by the terminal #1. The common DRX configuration information may refer to initial DRX configuration information or M-DRX configuration information. The base station and/or another terminal (e.g., terminal transmitting SL data to the terminal #0) may configure (e.g., signal) the common DRX configuration information to the terminal #0. Together with or independently of the above-described operation, the base station and/or terminal #0 may configure (e.g., signal) the common DRX configuration information to the terminal #1. Together with or independently of the above-described operation, the base station and/or the terminal #1 may configure (e.g., signal) the common DRX configuration information to the terminal #2.

In the communication environment described above, the terminal #1 may transmit to the terminal #0 and the terminal #2 an indicator (i.e., DRX trigger indicator) indicating that DRX operations are to be performed on all SLs supported by the terminal #1 based on the common DRX configuration information. When the DRX trigger indicator is received from the terminal #1, the terminals #0 and #2 may determine that DRX operations are to be performed based on the common DRX configuration information. After transmitting the DRX trigger indicator, the terminal #1 may perform a DRX operation based on the common DRX configuration information on each of the SL #1 and the SL #2.

The condition for changing the DRX configuration information may be a case when DRX operations are to be performed on all SLs supported by the terminal #1 or when DRX operations are to be performed on some SLs among all SLs supported by the terminal #1. The above-described exemplary embodiments may be applied to a communication environment in which a plurality of sidelinks are established for one terminal. In this case, the one terminal may generate DRX configuration information for the plurality of SLs and transmit the DRX configuration information to other terminal(s) operating on the respective plurality of SLs. DRX operations on the plurality of SLs may be performed based on the DRX configuration information configured by the one terminal described above.

The above-described exemplary embodiments may be equally or similarly applied to a case in which a DRX operation is performed first in the SL #1 and a DRX operation is required also in the SL #2 among the SLs #1 and #2.

Figure 12:
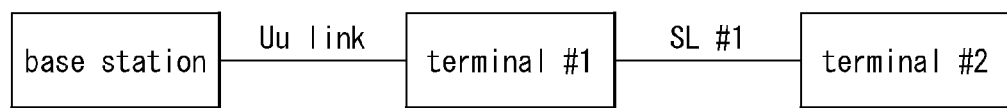
FIG. 12 is a conceptual diagram illustrating a sixth exemplary embodiment of a communication system supporting sidelink communication.

FIG. 12 is a conceptual diagram illustrating a sixth exemplary embodiment of a communication system supporting sidelink communication.

As shown in FIG. 12, a communication system may include a base station, terminal #1, and terminal #2. Each of the terminals #1 and #2 may be a V-UE located in a vehicle. A Uu link may be established between the base station and the terminal #1, and communication between the terminal and the terminal #1 may be performed in the Uu link. A SL #1 may be established between the terminal #1 and the terminal #2, and communication between the terminal #1 and the terminal #2 may be performed on the SL #1. The terminal #1 may perform a negotiation procedure (e.g., coordination procedure) of a DRX operation. The exemplary embodiments described with reference to FIG. 11 may be equally or similarly applied to the communication system (e.g., communication environment) shown in FIG. 12.

The terminal #1 may signal DRX configuration information to the base station through the Uu link. The DRX configuration information may be transmitted through a PUCCH or PUSCH. DRX configuration for the Uu link may take precedence over DRX configuration for the SL #1. For example, when DRX operations are to be supported on both the Uu link and the SL #1, the DRX configuration for the Uu link may not be changed and the DRX configuration for the SL #1 may be changed. When the terminal #1 performs DRX operations on the Uu link and the SL #1, DRX configuration information for the Uu link may be maintained, and DRX configuration information for the SL #1 may be changed in consideration of the DRX operation on the Uu link. The terminal #1 may change the DRX configuration information (e.g., DRX cycle, on-duration, off-duration, trigger timer, and/or time offset) for the SL #1 in consideration of the DRX operation on the Uu link. The terminal #1 may configure (e.g., signal) the changed DRX configuration information (e.g., M-DRX configuration information) to the terminal #2. Therefore, the DRX operations can be efficiently performed on the link Uu and the SL #1.

Meanwhile, when DRX configuration information for a plurality of DRX operations is shared by all terminals, the terminal #1 may configure (e.g., signal) an indicator (e.g., trigger indicator) instructing to start the plurality of DRX operations to other terminal(s). The DRX configuration information shared by all terminals may be configured based on information received from the base station and/or transmitting terminal(s). The exemplary embodiments according to extension, variation, and/or combination of the exemplary embodiments shown in FIGS. 7 to 12 described above may be applicable.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents

What is claimed is:

1. A method of a first user equipment (UE), the method comprising:
performing first sidelink (SL) communication with a second UE on a first link based on a discontinuous reception (DRX) operation according to first DRX configuration information;
performing second SL communication with a third UE on a second link without performing the DRX operation;
receiving common DRX configuration information for the DRX operation on the first link and the second link from a base station, the common DRX configuration information being applied to both the first SL and the second SL; and
performing the DRX operation based on the common DRX configuration information on the first link and the second link.

2. The method of claim 1, wherein the common DRX configuration information is generated by changing the first DRX configuration information in consideration of the DRX operation on the second link.

3. The method of claim 1, further comprising: transmitting, to the second UE and the third UE, a DRX trigger indicator indicating that the DRX operation based on the common DRX configuration information is to be performed on the first link and the second link, wherein the DRX operation is performed on the first link and the second link after the transmitting of the DRX trigger indicator.

4. The method of claim 1, wherein the common DRX configuration information is transmitted when both a first trigger timer configured for the first link and a second trigger timer configured for the second link are expired.

5. The method of claim 1, wherein the common DRX configuration information includes information indicating a first common DRX cycle for the first link and the second link.

6. The method of claim 1, wherein the common DRX configuration information includes a common time offset applied to a common DRX cycle for the first link and the second link.

7. The method of claim 1, wherein the common DRX configuration information is configured based on a resource pool (RP)-specific scheme, a cell-specific scheme, or a user equipment (UE)-specific scheme.

8. A first user equipment (UE) comprising: at least one processor,
wherein the at least one processor causes the UE to:
perform first sidelink (SL) communication with a second UE on a first link based on a discontinuous reception (DRX) operation according to first DRX configuration information;
perform second SL communication with a third UE on a second link without performing the DRX operation;
receive common DRX configuration information for the DRX operation on the first link and the second link from a base station, the common DRX configuration information being applied to both the first SL and the second SL; and
perform the DRX operation based on the common DRX configuration information on the first link and the second link.

9. The first UE of claim 8, wherein the common DRX configuration information is generated by changing the first DRX configuration information in consideration of the DRX operation on the second link, and the common DRX configuration information is commonly applied to the first link and the second link.

10. The first UE of claim 8, wherein the at least one processor further causes the UE to transmit, to the second UE and the third UE, a DRX trigger indicator indicating that the DRX operation based on the common DRX configuration information is to be performed on the first link and the second link, wherein the DRX operation is performed on the first link and the second link after the transmitting of the DRX trigger indicator.

11. The first UE of claim 8, wherein the common DRX configuration information is transmitted when both a first trigger timer configured for the first link and a second trigger timer configured for the second link are expired.

12. The first UE of claim 8, wherein the common DRX configuration information includes information indicating a common DRX cycle for the first link and the second link.

13. The first UE of claim 8, wherein the common DRX configuration information includes a common time offset applied to a common DRX cycle for the first link and the second link.

* * * * *